United States Patent
Dickenson et al.

(10) Patent No.: US 7,308,609 B2
(45) Date of Patent: Dec. 11, 2007

(54) METHOD, DATA PROCESSING SYSTEM, AND COMPUTER PROGRAM PRODUCT FOR COLLECTING FIRST FAILURE DATA CAPTURE INFORMATION

(75) Inventors: Marc Alan Dickenson, Austin, TX (US); Brent William Jacobs, Rochester, MN (US); Michael Youhour Lim, Leander, TX (US)

(73) Assignee: International Business Machines Corporation, Armonk, NY (US)

( * ) Notice: Subject to any disclaimer, the term of this patent is extended or adjusted under 35 U.S.C. 154(b) by 555 days.

(21) Appl. No.: 10/821,045

(22) Filed: Apr. 8, 2004

(65) Prior Publication Data

US 2005/0240826 A1    Oct. 27, 2005

(51) Int. Cl.
*G06F 11/00* (2006.01)
(52) U.S. Cl. .............................. 714/36; 714/15; 714/23
(58) Field of Classification Search .................. 714/15, 714/23, 36
See application file for complete search history.

(56) References Cited

U.S. PATENT DOCUMENTS

| | | | |
|---|---|---|---|
| 4,932,028 A | 6/1990 | Katircioglu et al. | 371/16.5 |
| 5,119,377 A | 6/1992 | Cobb et al. | 371/19 |
| 5,128,885 A | 7/1992 | Janis et al. | 395/575 |
| 5,463,768 A | 10/1995 | Cuddihy et al. | 395/183.13 |
| 5,696,897 A * | 12/1997 | Dong | 714/15 |
| 5,860,115 A | 1/1999 | Neuhard et al. | 711/147 |
| 5,884,019 A | 3/1999 | Inaho | 395/182.04 |
| 6,105,150 A | 8/2000 | Noguchi et al. | 714/44 |
| 6,148,415 A | 11/2000 | Kobayashi et al. | 714/15 |
| 6,182,243 B1 | 1/2001 | Berthe et al. | 714/38 |
| 6,279,120 B1 * | 8/2001 | Lautenbach-Lampe et al. | 714/15 |
| 6,502,208 B1 * | 12/2002 | McLaughlin et al. | 714/25 |
| 6,526,524 B1 | 2/2003 | Kelley | 714/38 |
| 6,775,698 B1 * | 8/2004 | Simone | 709/221 |

FOREIGN PATENT DOCUMENTS

JP       2000137630       5/2000

OTHER PUBLICATIONS

IBM Technical Disclosure Bulletin, "Multiple Address Space First Failure Data Capture", vol. 27, No. 06A, Jun. 1994, pp. 625-626.
IBM Technical Disclosure Bulletin, "Tracing, Formatting and Storage Referencing in an MVS Multitasking Online System", vol. 29, No. 3, Aug. 1986, pp. 1224-1227.
IBM Technical Disclosure Bulletin, "Error Log Analysis", vol. 23, No. 6, Nov. 1980, pp. 2493-2504.
IBM Technical Disclosure Bulletin, "Systems Network Architecture Distribution Services Agent In-Progress Queue Methods and Recovery", vol. 38, No. 02, Feb. 1995, pp. 465-472.

* cited by examiner

*Primary Examiner*—Bryce P Bonzo
(74) *Attorney, Agent, or Firm*—Duke W. Lee; Diana R. Gerhardt; Wayne P. Bailey

(57) ABSTRACT

A method, computer program product, and a data processing system for generating a data dump in a data processing system is provided. A system boot of the data processing system is initialized. A firmware that includes fault collection logic is executed. A data dump is created in a persistent storage of the data processing system. An attempt is made to complete the system boot of the data processing system.

8 Claims, 4 Drawing Sheets

METHOD, DATA PROCESSING SYSTEM, AND COMPUTER PROGRAM PRODUCT FOR COLLECTING FIRST FAILURE DATA CAPTURE INFORMATION

BACKGROUND OF THE INVENTION

1. Technical Field

The present invention relates generally to an improved data processing system and in particular to a data processing system and method for generating a data dump. Still more particularly, the present invention provides a mechanism for gathering first failure data collection information in a data processing system that has encountered a failure condition.

2. Description of Related Art

Data processing system failures cause many problems to the users of the system, especially when data is lost or corrupted. Therefore, when a data processing system fails, it is important to gather information that can aid in isolating and determining the problem associated with the failure.

The collection of first failure data capture (FFDC) information is an important part of common field service strategies utilizing embedded subsystems such as a service processor (SP) subsystem. The SP collects and stores as much FFDC data as possible into a limited non-volatile memory resource. The FFDC data is then later collected where it may be saved to a more permanent storage media and analyzed by, for example, field service personnel for analysis of the failures.

Current solutions do not allow for the dynamic reprioritization that is often necessary to capture all of the correct information in the limited storage space available for FFDC dumps. Moreover, current solutions do not provide reliability features for enabling data collection processes that are tolerant of failures that occur during the data collection phase.

Thus, it would be advantageous to provide a method and data processing system for enabling the dynamic reprioritization of data items captured by a first failure data capture system. Moreover, it would be advantageous to provide a data capture system that increases the reliability of a dump collection process.

SUMMARY OF THE INVENTION

The present invention provides a method, computer program product, and a data processing system for generating a data dump in a data processing system. A system boot of the data processing system is initialized. A firmware that includes first failure data capture logic is executed. A data dump is created in a persistent storage of the data processing system. An attempt is made to complete the system boot of the data processing system.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

DETAILED DESCRIPTION OF THE PREFERRED EMBODIMENT

Figure 1:
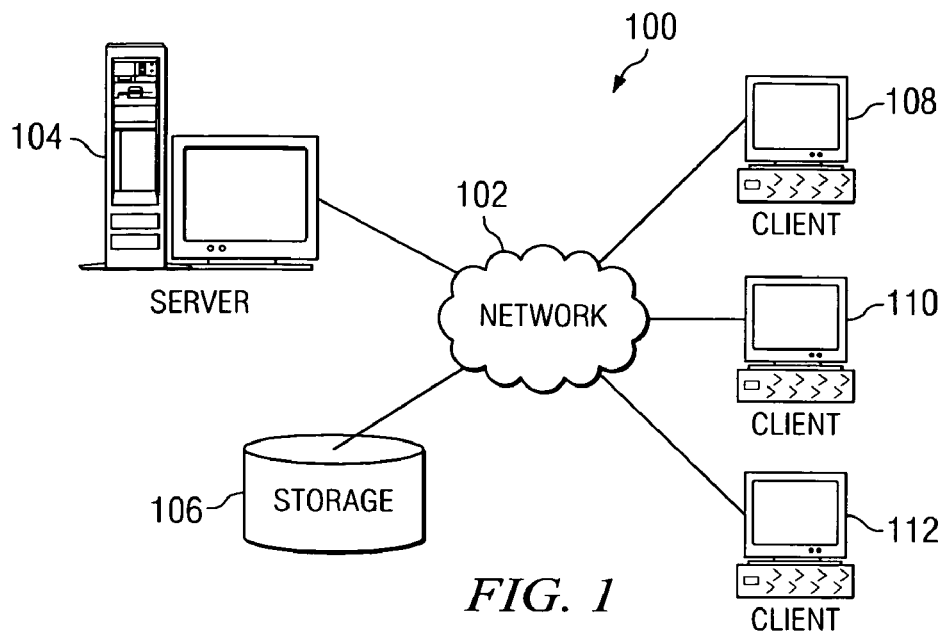
FIG. 1 depicts a pictorial representation of a network of data processing systems in which the present invention may be implemented.

With reference now to the figures, FIG. 1 depicts a pictorial representation of a network of data processing systems in which the present invention may be implemented. Network data processing system 100 is a network of computers in which the present invention may be implemented. Network data processing system 100 contains a network 102, which is the medium used to provide communications links between various devices and computers connected together within network data processing system 100. Network 102 may include connections, such as wire, wireless communication links, or fiber optic cables.

In the depicted example, server 104 is connected to network 102 along with storage unit 106. In addition, clients 108, 110, and 112 are connected to network 102. These clients 108, 110, and 112 may be, for example, personal computers or network computers. In the depicted example, server 104 provides data, such as boot files, operating system images, and applications to clients 108-112. Clients 108, 110, and 112 are clients to server 104. Network data processing system 100 may include additional servers, clients, and other devices not shown. In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for the present invention.

Figure 2:
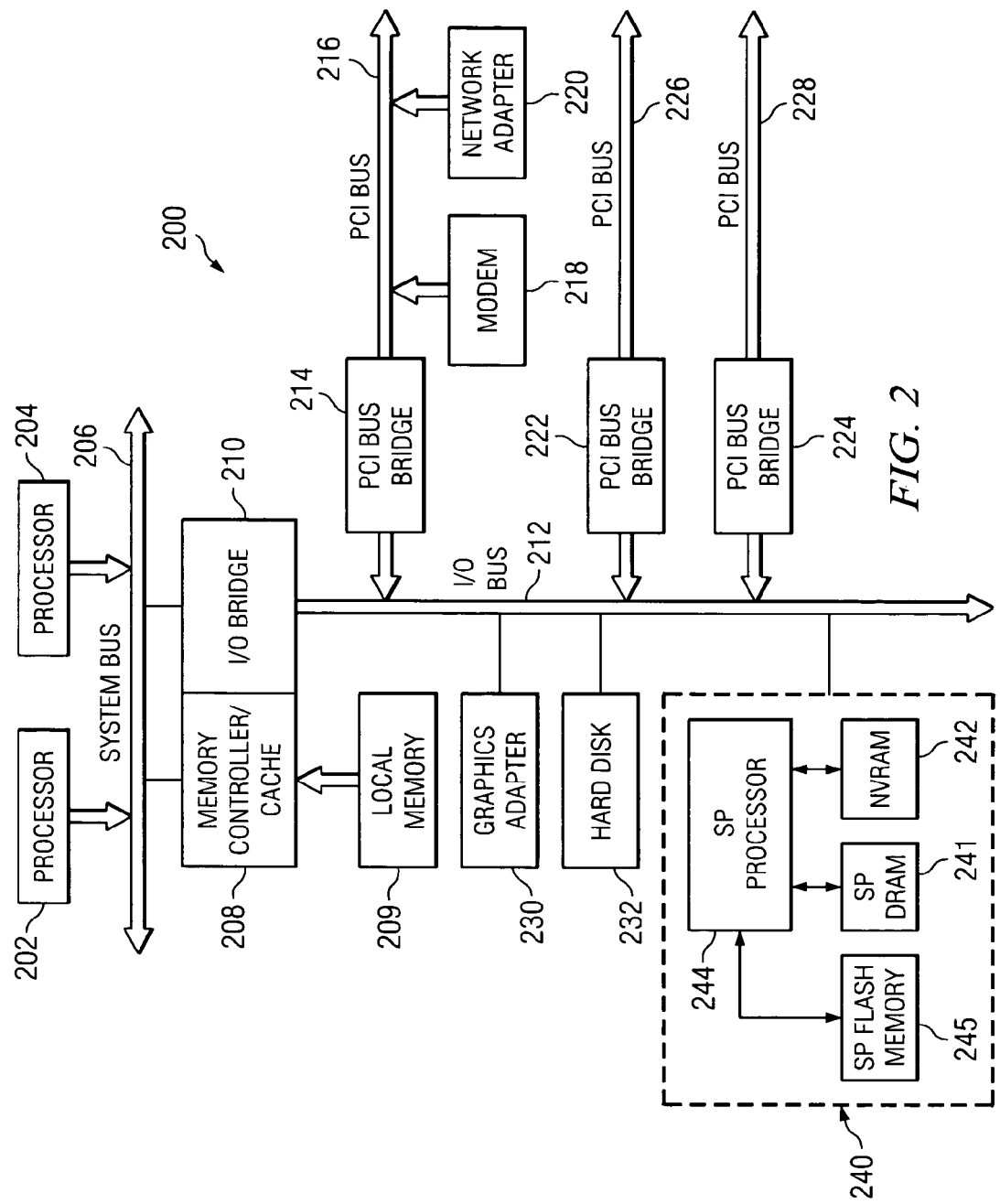
FIG. 2, a block diagram of a data processing system that may be implemented as a server in accordance with a preferred embodiment of the present invention.

Referring to FIG. 2, a block diagram of a data processing system that may be implemented as a server, such as server 104 in FIG. 1, is depicted in accordance with a preferred embodiment of the present invention. Data processing system 200 is an example system in which code or instructions implementing the processes of the present invention may be located. Data processing system 200 may be a symmetric multiprocessor (SMP) system including a plurality of processors 202 and 204 connected to system bus 206. Alternatively, a single processor system may be employed. Also, connected to system bus 206 is memory controller/cache 208, which provides an interface to local memory 209. I/O bus bridge 210 is connected to system bus 206 and provides an interface to I/O bus 212. Memory controller/cache 208 and I/O bus bridge 210 may be integrated as depicted.

Peripheral component interconnect (PCI) bus bridge 214 connected to I/O bus 212 provides an interface to PCI local bus 216. A number of modems may be connected to PCI local bus 216. Typical PCI bus implementations will support four PCI expansion slots or add-in connectors. Communications links to clients 108-112 in FIG. 1 may be provided through modem 218 and network adapter 220 connected to PCI local bus 216 through add-in connectors.

Additional PCI bus bridges 222 and 224 provide interfaces for additional PCI local buses 226 and 228, from which additional modems or network adapters may be supported. In this manner, data processing system 200 allows connections to multiple network computers. A memory-mapped graphics adapter 230 and hard disk 232 may also be connected to I/O bus 212 as depicted, either directly or indirectly.

In the depicted example, service processor (SP) 244 is connected to I/O bus 212 by direct component connection. SP processor 244 is connected to SP flash memory 245, SP dynamic random access memory (DRAM) 241, and non-volatile random access memory (NVRAM) 242. All of these components form an SP unit or module. SP flash memory 245 is an example of the flash memory in which firmware used for an initial program load (IPL) may be stored. SP DRAM 241 is a memory in which firmware binaries from SP flash memory 245 are loaded for execution by SP processor 244. NVRAM 242 may be used to hold data that is to be retained when the system is powered down. In this example, flash memory 245 provides storage for an initial program load firmware, which is used to initialize the hardware in data processing system 200. Additionally, flash memory 245 provides a persistent storage for storing a data dump comprising first failure data capture information collected in response to detection of a system or application error or fault condition.

Those of ordinary skill in the art will appreciate that the hardware depicted in FIG. 2 may vary. For example, other peripheral devices, such as optical disk drives and the like, also may be used in addition to or in place of the hardware depicted. The depicted example is not meant to imply architectural limitations with respect to the present invention.

The data processing system depicted in FIG. 2 may be, for example, an IBM eServer pSeries system, a product of International Business Machines Corporation in Armonk, N.Y., running the Advanced Interactive Executive (AIX) operating system or LINUX operating system.

The first failure data capture system instructions are preferably executed by SP processor 244 of data processing system 200 shown in FIG. 2. In accordance with the present invention, hardware device drivers and software components that detect failures make persistent records of the failures using a software facility provided for this purpose, herein called the first failure data capture (FFDC) system. The FFDC system logic is implemented as part of the SP subsystem collectively designated as SP subsystem 240 in FIG. 2. SP subsystem 240 may be implemented as a distinct data processing system or alternatively may be implemented as a subsystem of a integrated in a host data processing system. In the examples provided herein, SP subsystem 240 is shown and described as comprising a subsystem integrated with data processing system 200, and such an implementation is exemplary only. SP subsystem 240 creates a failure report if an error or fault condition is detected in data processing system 200. FFDC error data may be associated with an application error or an operating system error. FFDC information is stored as a data dump and associated header information written to, for example, SP flash memory 245 shown in FIG. 2.

Figure 3:
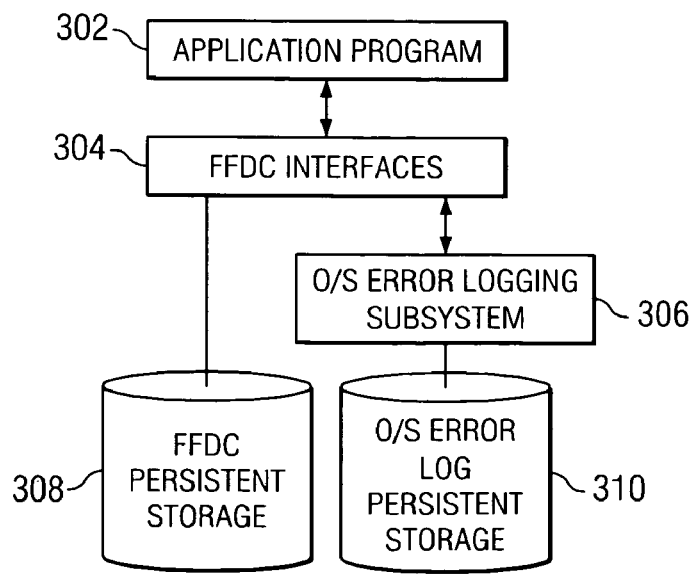
FIG. 3 is a diagrammatic illustration of a first failure data capture system implemented according to a preferred embodiment of the present invention.

FIG. 3 is a diagrammatic illustration of a first failure data capture system implemented according to an embodiment of the present invention. One or more application programs 302 communicates with FFDC interface 304 implemented in accordance with the principles of the present invention. FFDC interface 304 stores and retrieves failure reports through, in one example, an operating system (O/S) error logging subsystem 306 to an O/S error log persistent storage 310, or alternatively, to a error stack FFDC persistent storage 308. FFDC persistent storage 308 and O/S error log persistent storage 310 may be recorded in SP flash memory 245. In an alternate embodiment, FFDC persistent storage 308 and error log persistent storage 310 may comprise the same storage within data processing system 200. FFDC persistent storage 308 could store information that would not normally go into O/S error log persistent storage 310. FFDC persistent storage 308 and error logging persistent storage 310 are components available in SP subsystem 240 offered by International Business Machines Corporation.

Preferably, when making a failure record, the FFDC system component provides enough information so that: 1) the failure is adequately described so that later analysis efforts may determine the nature and scope of the failure condition; and 2) specific details that are of importance to the data processing system environment such that the manufacturer of data processing system 200 can determine how the condition came to exist so any flaws in the data processing system environment can be identified and repaired.

FFDC interface 304 writes a dump to SP flash memory 245 upon detection of a failure condition. The dump may have encapsulated data such as the time at which the failure report was recorded. Other data describing the failure condition may be recorded as well.

Data processing system 200 may then be serviced for collection and analysis of the FFDC data. Alternatively, FFDC data may be communicated to a central repository, such as a central server functioning as a repository for the storage of FFDC data.

Figure 4A:
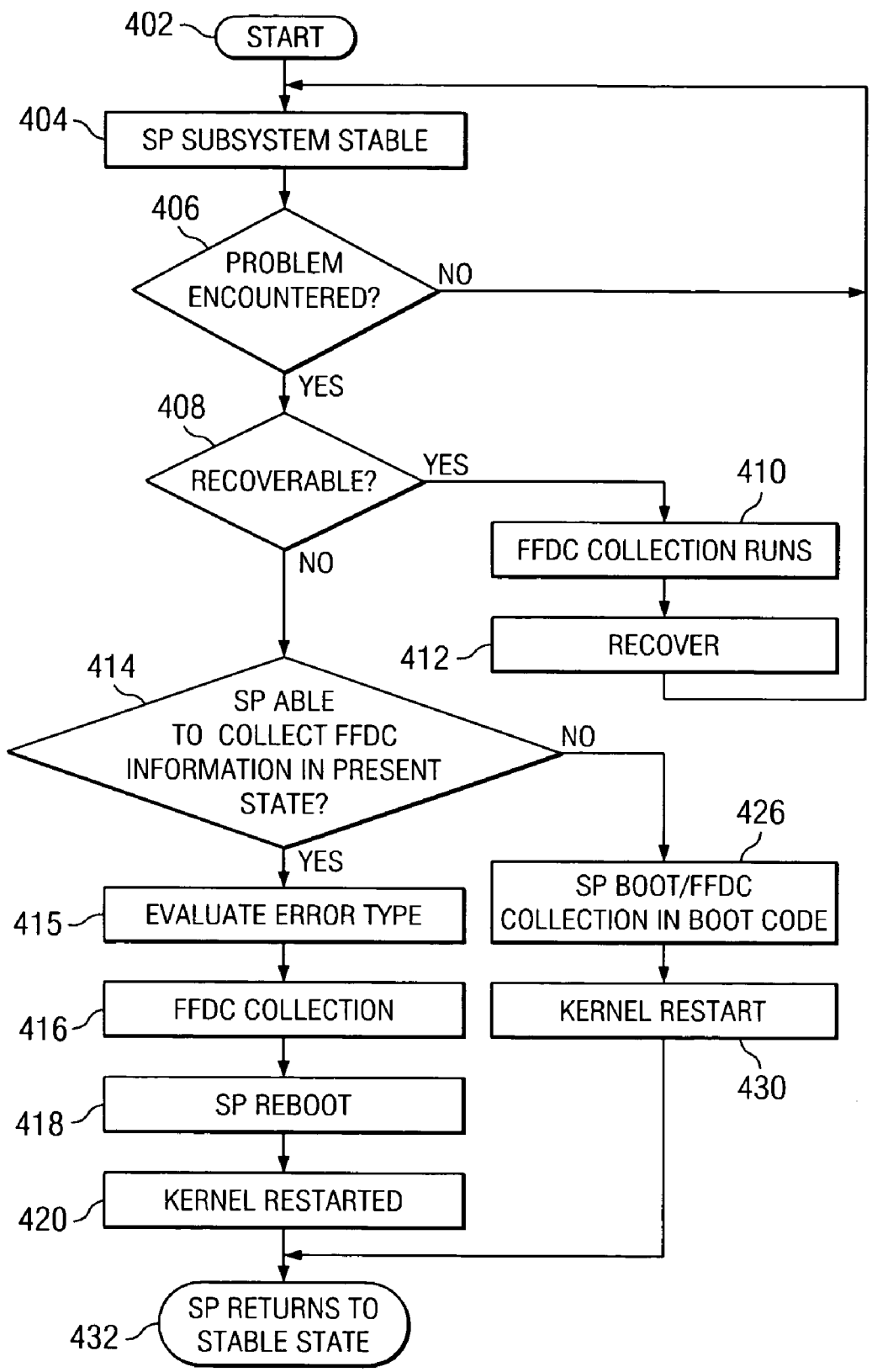
FIG. 4A is a flowchart of processing performed by the first failure data capture interface shown in FIG. 3 in accordance with a preferred embodiment of the present invention.

FIG. 4A is a flowchart of processing performed by FFDC interface 306 in accordance with a preferred embodiment of the present invention. SP subsystem 240 is initialized (step 402) and begins running in a stable state (step 404). SP subsystem 240 monitors for system errors or faults (step 406) until a fault condition is encountered. When a fault condition is encountered, SP subsystem 240 determines if the error is recoverable (step 408), that is if the system kernel is still running and SP subsystem 240 remains stable. If the error is recoverable, SP subsystem 240 invokes an FFDC routine and a dump including error or fault data is captured by FFDC interface 304 of FIG. 3 (step 410). The FFDC routine invoked at step 410 is implemented as computer executable logic that runs on the system kernel. The dump is encapsulated and placed in a persistent storage, such as SP flash memory 245 of SP subsystem 240. Once the FFDC information is collected and stored, data processing system 200 is returned to a stable state (step 412), and SP subsystem 240 returns to monitoring for fault conditions.

If, however, the error or fault condition is determined to be unrecoverable, FFDC information may be collected in one of two manners in accordance with a preferred embodiment of the present invention. If the SP state is evaluated as suitable for collection of the FFDC information at step 414, a fault type evaluation is made (step 415). For example, the fault may be determined to be an unexpected application failure such as a critical application failure, a threshold exceeded failure, or the like. An FFDC routine then runs (step 416), after which SP subsystem 240 reboots (step 418). The system kernel is then restarted (step 420), and SP subsystem 240 returns to a stable state for monitoring system fault conditions (step 432).

In other situations, the SP may not be in a state suitable for collection of FFDC information at step 414. For example, SP subsystem 240 may hang, panic, or enter a non-responsive state. Alternatively, SP subsystem 240 may be unexpectedly brought down by a host initiated reset, e.g., a hard boot. An SP reboot is then performed and FFDC information collection is invoked during boot in accordance with a preferred embodiment of the present invention (step 426). FFDC collection performed in accordance with step 426 is implemented as a dump collection routine in the system boot code and is executed during a reboot in accordance with a preferred embodiment of the present invention as described more fully below. An attempt is then made to restart the system kernel (step 430), and SP subsystem 240 is returned to a stable state (step 432) for monitoring fault events upon a successful kernel restart.

Figure 4B:
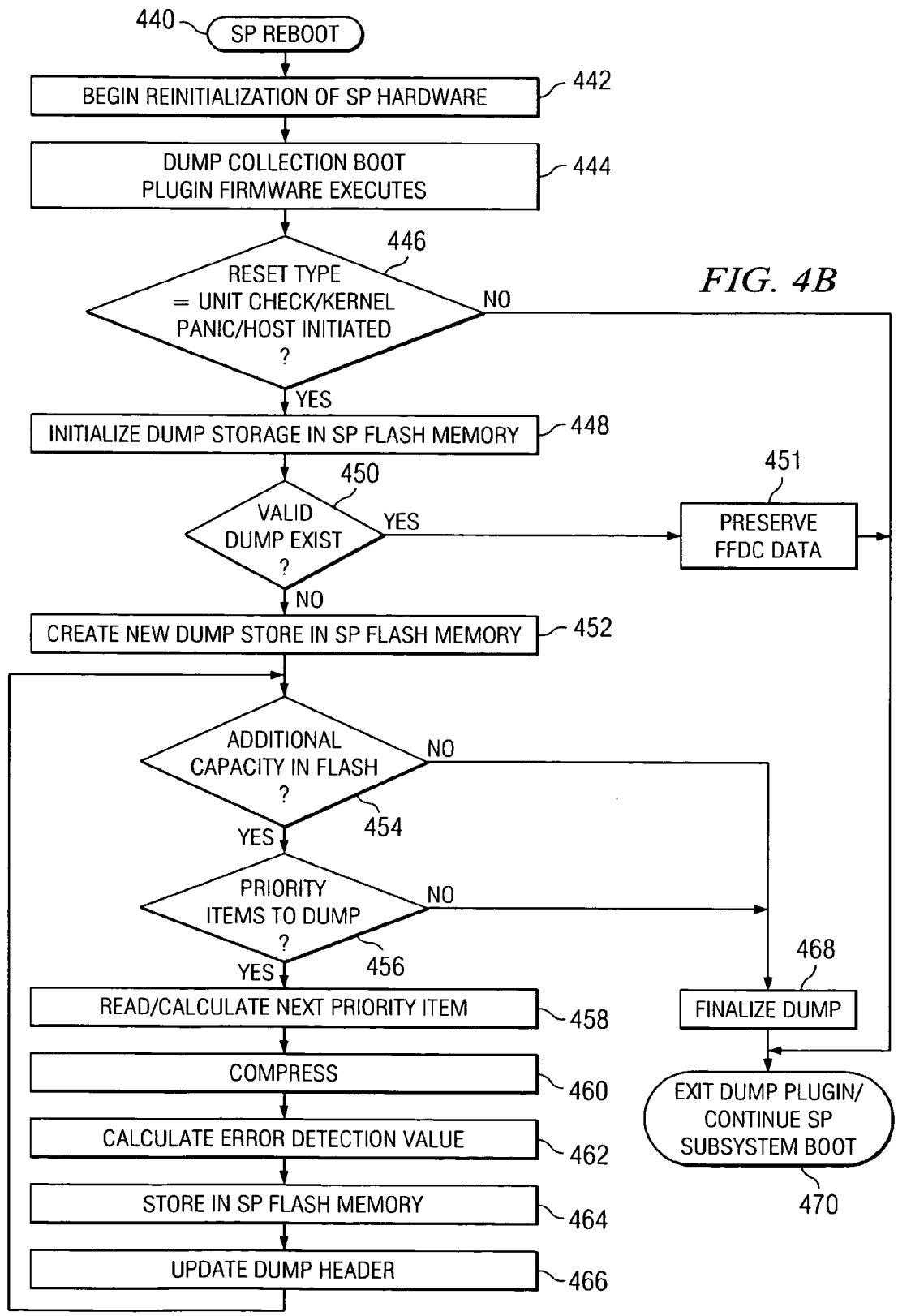
FIG. 4B is a flowchart of first failure data capture information collection performed during reboot of a service processor subsystem of the data processing system shown in FIG. 2 in accordance with a preferred embodiment of the present invention.

FIG. 4B is a flowchart of FFDC collection performed during reboot of SP subsystem 240 in accordance with a preferred embodiment of the present invention. The processing steps of FIG. 4B correspond to processing step 426 of FIG. 4A. The collection of FFDC information is performed by a dump collection routine executed during system boot when data processing system 200 is not in a state to collect the FFDC information upon the fault condition. In a preferred embodiment, the FFDC collection routine is implemented as a firmware plugin that extends the operating system boot code. As such, the FFDC collection begins at SP subsystem 240 reboot (step 440). SP subsystem 240 hardware, such as SP processor 244, SP flash memory 245, and the like shown in FIG. 2, begins reinitialization (step 442). The dump collection firmware then begins execution (step 444). The dump collection firmware logic first evaluates the reset type for a boot dump collection reset type (step 446). In a preferred embodiment, a boot dump collection reset type may be identified as a unit check reset, a kernel panic reset, or a host-initiated reset. If the reset type is not evaluated as a boot dump collection reset type at step 446, the boot dump collection routine exits and SP subsystem 240 continues the boot process (step 470).

If the reset type is evaluated as a boot dump collection reset type at step 446, SP flash memory 245 is initialized for data storage (step 448). SP flash memory 245 is then evaluated to determine if a valid dump exists in SP flash memory 245 (step 450). For example, when a dump is written by SP subsystem 240, a valid dump indictor bit in the dump header may be asserted to indicate the dump is valid. Accordingly, an address of SP flash memory 245 may be read at step 450 for evaluation of a dump indicator bit and thus the presence or absence of a valid dump in SP flash memory 245. The boot collection dump routine preserves the FFDC data dump (step 451), and the boot dump collection routine then exits and SP subsystem continues the boot process (step 470) if a valid dump is identified in SP flash memory 245.

A new dump is created and stored in SP flash memory 245 (step 452) if a valid dump is not identified at step 450. The boot dump collection routine then evaluates SP flash memory 245 for additional storage capacity (step 454).

Preferably, the boot dump collection routine collects or calculates dump data on a priority basis. Generation of a valid dump header, for example, may be assigned a higher priority than calculation of error detection data as a valid dump header is often more critical in a dump analysis than error detection values calculated on the dump data. Table A is an exemplary priority list that may be evaluated by the boot dump collection routine for determining additional data to add to a dump being generated and corresponding data item locations. Data item locations designated as "Calculated" are calculated by the boot dump collection routine logic.

TABLE A

| Priority | Data Item | Location |
|---|---|---|
| 1 | Headers | Calculated |
| 2 | DRAM Buffers | DRAM |
| 3 | NVRAM Buffers | NVRAM |

If the boot dump collection routine determines SP flash memory 245 has remaining capacity for storage of additional dump information at step 454, an evaluation is made to determine if any priority item remains for dump collection (step 456). The highest remaining priority item is read or calculated (step 458) if the boot dump collection routine determines any priority items remain to be added to the dump at step 456. The data item is then compressed (step 460) and an error detection code, such as a cyclic redundancy check (CRC) value, is calculated on the data item (step 462). The data item is then added to the dump in SP flash memory 245 (step 464), and the boot dump collection routine updates the dump header to indicate inclusion of the added item to the dump (step 466). The boot dump collection routine then returns to evaluate SP flash memory 245 for additional capacity for dump storage.

When either an evaluation is made that the capacity of SP flash memory 245 for dump storage has been consumed at step 454, or that no priority items remain to be added to the dump at step 456, the boot dump collection routine proceeds to finalize the dump (step 468). For example, the boot dump collection routine may complete the dump headers, calculate error detection values, and close the dump file. The boot dump collection routine then exits and SP subsystem 240 continues the boot process (step 470). Upon completion of SP subsystem 240 boot, system processing returns to step 430 of FIG. 4A.

Thus, the boot dump collection routine provides a mechanism for collection of FFDC data when a system fault condition results in a system state where the service processor is unable to collect FFDC data without a reboot. By implementing FFDC collection during a service processor boot, FFDC information may be collected even if the system fault results in impairment of the data processing system to the extent that the system is inoperable, i.e. the system kernel is unable to be brought up after the system fault. For example, the FFDC information may be collected by execution of the boot dump collection routine at step 426 of FIG. 4A. In the event that the kernel is unable to be brought up at step 430 of FIG. 4A, the FFDC information collected by the boot dump collection routine may still be retrieved by manually removing SP subsystem 240 from data processing system 200. Thus, the FFDC information may be analyzed even in the event that the system fault renders the data processing system inoperable.

In accordance with another embodiment of the present invention, the first failure data capture system of the present invention facilitates dynamic reprioritization of data that is collected in a data dump. Often, the most significant data for properly evaluating a system fault cause is dependent on the fault type. For example, data retrieved from DRAM buffers may be the most critical data for properly evaluating a particular type of system failure, while data retrieved from an NVRAM buffer may be the most critical data for properly evaluating another type of system failure. In accordance with a preferred embodiment of the present invention, the items in the priority list described above may be dynamically prioritized dependent on the an evaluated system fault type. For example, each of the priority items of the priority list shown in Table A may have separate index values associated with a reset type evaluated at step 446 of FIG. 4B. Alternatively, each of a plurality of priority lists may be associated with a particular type of system fault, such as a reset type evaluated by the first failure data capture system at step 446 of FIG. 4B. The first failure data capture system then collects items prioritized in accordance with the evaluated fault condition.

As described, a first failure data capture system provides mechanisms for data dump collection of first failure data capture information for recoverable application failures and non-recoverable system failures where the service processor remains in a state suitable for data dump generation. Additionally, the first failure data capture system provides a mechanism implemented as a boot dump collection routine for the collection of FFDC information when a system fault condition results in a system state requiring execution of a system reboot. Firmware executed during boot of the service processor collects FFDC information prior to an attempt to restart the system kernel. Moreover, dynamic reprioritization of data items collected by the first failure data capture system is provided.

It is important to note that while the present invention has been described in the context of a fully functioning data processing system, those of ordinary skill in the art will appreciate that the processes of the present invention are capable of being distributed in the form of a computer readable medium of instructions and a variety of forms and that the present invention applies equally regardless of the particular type of signal bearing media actually used to carry out the distribution. Examples of computer readable media include recordable-type media, such as a floppy disk, a hard disk drive, a RAM, CD-ROMs, DVD-ROMs, and transmission-type media, such as digital and analog communications links, wired or wireless communications links using transmission forms, such as, for example, radio frequency and light wave transmissions. The computer readable media may take the form of coded formats that are decoded for actual use in a particular data processing system.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A method of generating a data dump in a data processing system, the method comprising the computer implemented steps of:

initializing a system boot of the data processing system;

executing a firmware that includes first failure data capture logic;

creating a data dump in a persistent storage of the data processing system;

evaluating a fault type of the data processing system; and writing a plurality of data items to the data dump, wherein the writing of the data items is dynamically reprioritized dependent on the fault type.

2. A computer program product encoded in a computer recordable medium and operable for generating a data dump in a data processing system when executed by the data processing system, the computer program product comprising:

first instructions for evaluating a reset type of the data processing system;

second instructions for determining whether a valid data dump is maintained by the data processing system; and third instructions, responsive to determining that a valid data dump is not maintained by the data processing system, for executing first failure data capture logic during a boot of the data processing system, including sub-instructions that obtain a priority item from a plurality of priority items to write to a data dump in the persistent storage.

3. The computer program product of claim 2, wherein the third instructions evaluate a capacity of a persistent storage.

4. The computer program product of claim 3, wherein the sub-instructions that obtain a priority item from a plurality of priority items to write to a data dump in the persistent storage are responsive to determining that additional capacity remains in the persistent storage.

5. The computer program product of claim 4, wherein the plurality of priority items are sequenced according to a reset type.

6. A computer program product encoded in a computer recordable medium and operable for generating a data dump in a data processing system when executed by the data processing system, the computer program product comprising:

first instructions for evaluating a reset type of the data processing system;

second instructions for determining whether a valid data dump is maintained by the data processing system;

third instructions, responsive to determining that a valid data dump is not maintained by the data processing system, for executing first failure data capture logic during a boot of the data processing system;

fourth instructions for evaluating a plurality of priority items in a priority list; and fifth instruction, responsive to the fourth instructions evaluating each of the plurality of priority items as having been written to a data dump, that finalize the data dump for storage.

7. The computer program product of claim 6, wherein the fifth instructions, responsive to the data dump being finalized for storage, that terminate execution of the first failure data capture logic.

8. The computer program product of claim 7, further comprising:

sixth instructions, responsive to the first failure data capture logic being terminated, that attempt to restart a system kernel of the data processing system.

* * * * *